July 5, 1927.
D. W. BARTLEBAUGH
WEEDER AND THE LIKE
Filed May 27, 1926
1,634,606
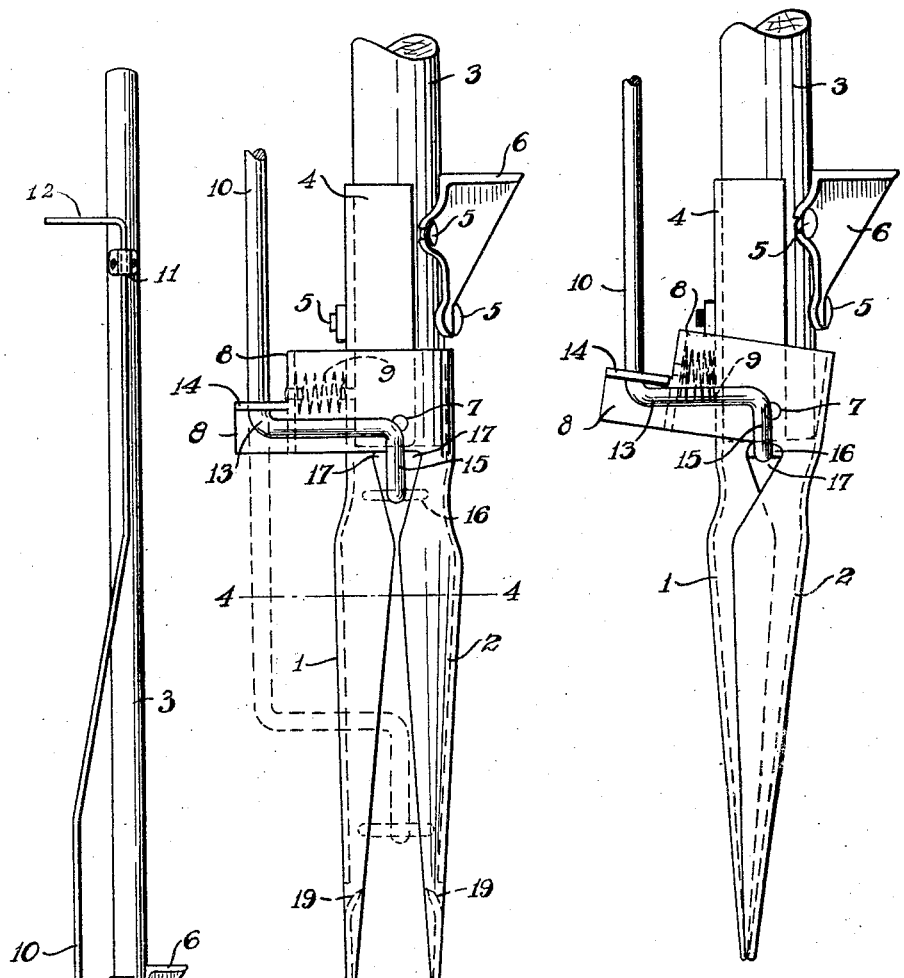
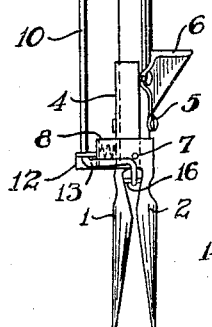
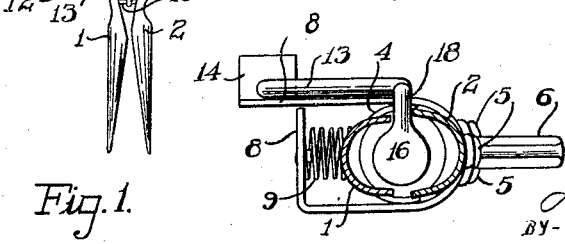
INVENTOR
ATTORNEY Patented July 5, 1927.

1,634,606

UNITED STATES PATENT OFFICE.

DAVID W. BARTLEBAUGH, OF SPRINGFIELD, OHIO.

WEEDER AND THE LIKE.

Application filed May 27, 1926. Serial No. 112,147.

This invention relates to weeders.

The object attained in the invention is a hand tool having jaws adapted to penetrate the ground and to grip weeds by the roots and thus to pull the weeds out of the ground as the jaws are withdrawn.

The improved weeder is especially adaptable for removing weeds from lawns or ground sodded with grass in which the roots of weeds, as dandelions, etc., become firmly imbedded and cannot be destroyed except by extracting the roots with the tops of the plants.

Features of the improved weeder consist in its adaptability for penetrating the ground and extracting the weeds without leaving holes or displaced soil of any consequence, or otherwise injuring the sod; in its adaptability for convenient use without stooping or kneeling down to the work, or soiling or staining the hands of the user by coming in contact with the weeds as the same are dug out of the soil.

The improved weeder is also simply constructed, has few parts, can be cheaply made and sold at a popular price. It is also substantial and practically indestructible under normal conditions of use.

In the accompanying drawings in which the weeder is illustrated in a preferred form:

Fig. 1 is a side view illustrating the complete tool;

Fig. 2 is an enlarged view of the weeder jaws shown open;

Fig. 3 is a view of the weeder jaws closed;

Fig. 4 is a cross sectional view on line 4—4 of Fig. 2.

As here shown, the weeder consists of oppositely disposed, tapered jaws 1—2 supported on the lower end of a staff or handle 3, jaw 1 having a shank 4 which serves for securing the jaw firmly to the handle by means of rivets, or threaded bolts 5 as here shown, the bolts also serving to secure a foot rest 6 to the handle for thrusting the jaws into the ground.

Jaw 2 is pivoted on the handle as indicated at 7, the pivot stud passing through the handle thus to firmly support the jaw. Formed integrally with jaw 2 is a portion 8 arranged telescopically of the handle and extended laterally therefrom to form a housing for a compression spring 9 which acts by exerting pressure on the upper portion of jaw 2 to normally hold the jaws open, or spaced one from the other, to permit the jaws to be positioned over the weed with the root between the jaws as the same are thrust into the ground.

A rod 10 extended longitudinally of the handle 3, retained slidably thereon by a strap 11, and having a bent portion 12 for manipulating the rod by hand serves for operating jaw 2 relative to jaw 1, the rod being connected to the laterally extended portion 8 of the jaw by means of a bend in the rod which presents a shoulder 13 to a portion 14 extended laterally at an angle to part 8 and apertured to receive the rod.

A downward extension 15 of rod 10 between the jaws 1—2 and having a shoe 16 secured to its end serves for ejecting the weeds from the jaws after the same are extracted. A clearance 17 in each jaw for rod 10 permits the jaws to close over the rod and a shoulder 18 in the rod slides between the jaws and acts to open the same as the rod is projected downward to eject the weeds.

Each jaw of the weeder, as here shown, has an inverted tooth 19 formed therein, the teeth being opposite one of the other and adapted to effect a firmer grip on the roots as the jaws are closed, the teeth acting to prevent the jaws slipping over the root as the tool is moved upward to extract it.

From the foregoing detailed description and the illustrations of the drawings the construction and operation of my improved weeder will be readily understood. Briefly stated, the operation of the tool is as follows:—The tool with the jaws open is set over the weed to be extracted, the jaws being substantially parallel one with the other so that the root of the plant will be between the jaws as the same are thrust into the soil by foot pressure. The jaws are then closed by moving rod 10 upward. Rod 10 is held firmly in raised position thus causing the jaws of the tool to grip the root firmly as the tool is lifted to extract the weed. Rod 10 is then moved downward to eject the root from the jaws. As the rod is again moved to its normal raised position, spring 9 acts to hold the jaws open.

Having described my invention, I claim:

1. A weeder including in combination with a staff, a tapered jaw fixed on an end thereof, a jaw pivoted on the staff opposite and coacting with the fixed jaw, a rod extended longitudinally of the staff, adapted to be manipulated to actuate the movable jaw relative to the fixed jaw to grip an object, and having a portion extended between the jaws operable with the rod to eject said object from the jaws.

2. A weeder including in combination with a staff, a tapered jaw fixed on an end thereof, a jaw pivoted on the staff opposite and coacting with the fixed jaw, a rod extended longitudinally of the staff, adapted to be manipulated to actuate the movable jaw relative to the fixed jaw to grip an object, and having a portion extended between the jaws operable with the rod to eject said object from the jaws, and clearance provided in the jaws to permit said extended portion of the rod to enter between the jaws.

3. A weeder including in combination with a staff, an extended jaw fixed on an end of the staff, an operable jaw adapted to coact with the fixed jaw, foot pressure means for thrusting the jaws into the ground over a plant, a rod slidable on the staff to operate the movable jaw to grip the root of said plant between the jaws to extract the same, and having a portion extended between the jaws and operable with the rod in the opposite direction to eject the plant from the jaws.

4. A weeder including in combination with a staff, a tapered jaw fixed on an end thereof, a jaw pivoted on the staff opposite and coacting with the fixed jaw, having a part disposed around and extended laterally of the staff, a rod slidably supported on said staff, directed away from the staff and presenting a shoulder acting on said laterally extended portion to actuate said movable jaw and having a portion slidable between the jaws.

In testimony whereof, I affix my signature.

DAVID W. BARTLEBAUGH.